United States Patent
Yamasaki et al.

(10) Patent No.: US 6,759,168 B2
(45) Date of Patent: Jul. 6, 2004

(54) NONAQUEOUS SECONDARY BATTERY WITH LITHIUM TITANIUM CATHODE

(75) Inventors: Shinji Yamasaki, Ibaraki (JP); Takatomo Nishino, Ono (JP); Akira Asada, Hyogo-ken (JP)

(73) Assignee: Hitachi Maxell, Ltd., Osaka (JP)

( * ) Notice: Subject to any disclaimer, the term of this patent is extended or adjusted under 35 U.S.C. 154(b) by 159 days.

(21) Appl. No.: 09/986,722

(22) Filed: Nov. 9, 2001

(65) Prior Publication Data

US 2002/0026707 A1 Mar. 7, 2002

Related U.S. Application Data

(63) Continuation of application No. 09/011,532, filed as application No. PCT/JP97/02008 on Jun. 11, 1997, now Pat. No. 6,379,843.

(30) Foreign Application Priority Data

Jun. 14, 1996 (JP) .............................................. 8-176001

(51) Int. Cl.$^7$ .............................. H01M 4/48; H01M 4/40
(52) U.S. Cl. ............................... 429/231.5; 429/231.95; 429/231.4
(58) Field of Search ........................... 429/231.1, 231.4, 429/231.5, 218.1, 231.95

(56) References Cited

U.S. PATENT DOCUMENTS

| 5,028,500 A | * | 7/1991 | Fong et al. ................. 429/224 |
| 5,378,560 A | | 1/1995 | Tomiyama |
| 5,464,708 A | * | 11/1995 | Neat et al. ............... 429/231.1 |
| 5,545,468 A | | 8/1996 | Koshiba et al. |
| 5,698,338 A | | 12/1997 | Barker et al. |
| 5,750,287 A | | 5/1998 | Kinoshita et al. |
| 5,948,569 A | * | 9/1999 | Moses et al. ............... 429/246 |
| 6,001,139 A | * | 12/1999 | Asanuma et al. .......... 29/623.3 |
| 6,025,093 A | * | 2/2000 | Herr ........................ 429/231.4 |

FOREIGN PATENT DOCUMENTS

EP    0617474 A1    9/1994

OTHER PUBLICATIONS

Ohzuku et al. (J. Electrochem. Soc., vol. 142, No. 5, May 1995, pp. 1431–1435).*
Ohzuku et al., "Zero–Strain Insertion Material . . . ", J. Electrochem. Soc., vol. 142, pp. 1431–1435.
Bonino et al., "Anatase as a Cathode Material . . . ", J. Power Sources, vol. 6, pp. 261–270 (month not available).
Liebert et al., "Evaluation of lithium titanates . . . ", Proceeding Electrochemical Society, vol. 77–6, Proc. Symp. Electrode Mater. Processes Energy Convers., pp. 821–832 (no month available).
Dominey, "Current State of the Art on Lithium Battery Electrolytes", in "Lithium Batteries, Industrial Chemistry Library, vol. 5" G. Pistoia, editor, pp. 174–152, Elsevier Publishing (no month available).
Ohzuku, Chapter 6 in "Industrial Chemistry Library, vol. 5, Lithium Batteries", Elsevier Publishers, p. 239 (no month).

* cited by examiner

Primary Examiner—Carol Chaney
(74) Attorney, Agent, or Firm—Birch, Stewart, Kolasch & Birch, LLP

(57) ABSTRACT

A method for manufacturing a lithium secondary cell comprising a positive electrode containing a lithium titanate as an active material, a negative electrode containing a carbonaceous material as an active material, and an electrolytic solution comprising a solution of a lithium salt in an organic solvent. The lithium titanate preferably has a composition of the formula:

$$Li_xTi_yO_4$$

($0.8 \leq x \leq 1.4$ and $1.6 \leq y \leq 2.2$).

The lithium secondary cell has a high capacity suitable for use as a power source for a wristwatch and good charge-discharge properties, at a nominal voltage of 1.5 V.

18 Claims, 3 Drawing Sheets

NONAQUEOUS SECONDARY BATTERY WITH LITHIUM TITANIUM CATHODE

This application is a continuation of co-pending application Ser. No. 09/011,532, filed on Feb. 12, 1998 and for which priority is claimed under 35 U.S.C. § 120, which is the national phase of PCT International Application No. PCT/JP97/02008 filed on Jun. 11, 1997 under 35 U.S.C. § 371. The entire contents of each of the above-identified applications are hereby incorporated by reference.

BACKGROUND OF THE INVENTION

This application is the national phase under 35 U.S.C. §371 of prior PCT International Application No. PCT/JP97/02008 which has an International filing date of Jun. 11, 1997 which designated the United States of America, the entire contents of which are hereby incorporated by reference.

1. Field of the Invention

The present invention relates to a lithium secondary cell. In particular, the present invention pertains to lithium secondary cells suitable as backup batteries for watches, power sources for portable devices such as pagers, timers, etc., backup batteries for memories, and the like.

2. Description of the Related Art

Lithium secondary cells comprising a negative electrode made of metal lithium or a lithium alloy have been mainly developed as secondary cells. However, when the metal lithium or lithium alloy is contained in the negative electrode, lithium ions in an electrolyte tend to precipitate in the form of metal lithium on the negative electrode during recharging. The deposited lithium forms minute particles or grows lithium dendrites on the surface of the negative electrode, and causes a short-circuit in the cell. Thus, the charge-discharge cycle life of the cell is shortened. Consequently, lithium cells, which use neither metal lithium nor a lithium alloy in the negative electrode and have a high energy density, have been studied.

Currently, primary cells such as silver oxide cells are used as power sources for wristwatches. However, the primary cells suffer from problems associated with disposal of the used cells. Thus, wristwatches having built-in power generators, which require no replacement of the cells, have been developed, and electric double layer capacitors are used as power sources used in such wristwatches. However, the electric double layer capacitors have a small capacity per unit volume, and thus it is desired to develop substitute power sources for the electric double layer capacitor.

SUMMARY OF THE INVENTION

One object of the present invention is to provide a lithium secondary cell which can be charged and discharged, does not suffer from the problem of disposal, and has a high capacity so that it is suitable as a power source for a wristwatch.

Accordingly, the present invention provides a lithium secondary cell comprising a positive electrode containing lithium titanate as an active material, a negative electrode containing a carbonaceous material as an active material, and an electrolytic solution comprising a solution of a lithium salt in an organic solvent.

Since a lithium titanate as a positive electrode active material and a carbonaceous material as a negative electrode active material are used in combination, the lithium ions can be easily doped and dedoped at a nominal voltage of 1.5 V, and thus a lithium secondary cell having a high capacity and good charge-discharge cycle properties is obtained.

DETAILED DESCRIPTION

Figure 1:
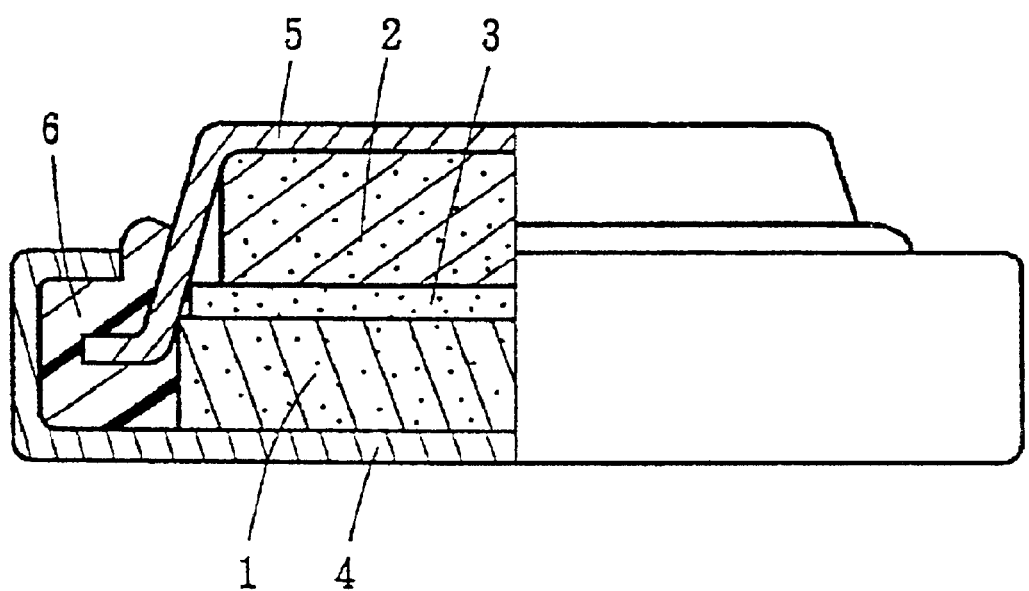
FIG. 1 is a cross section of an example of a lithium secondary cell according to the present invention.

A lithium titanate used as a positive electrode active material according to the present invention can be prepared by heating titanium oxide and a lithium compound at a temperature of between 760 and 1100° C.

In general, the lithium titanate is represented by the formula (1):

$$Li_xTi_yO_4 \qquad (1)$$

Usually, x and y in the above formula are numerals in the range between 0.8 and 1.4 (0.8 ≦x≦1.4), and between 1.6 and 2.2 (1.6 ≦y≦2.2), respectively. In particular, the lithium titanate of the formula (1) in which x is 1.33 and y is 1.67 is preferable.

Titanium oxide may be either anatase or rutile. The lithium compound may be lithium hydroxide, lithium carbonate, lithium oxide, and the like.

A positive electrode is preferably prepared by mixing lithium titanate, a conducting aid and a binder to obtain a positive electrode mixture, and shaping the mixture under pressure.

Examples of the conducting aid are scaly graphite, acetylene black, carbon black, and the like. Fluororesins are preferably used as binders. Examples of fluororesins are polytetrafluoroethylene, polyvinylidene fluoride, and the like.

Proportions of the components constituting the positive electrode are preferably 70 to 90 wt. % of the lithium titanate as the positive electrode active material, 5 to 20 wt. % of the conducting aid, and 1 to 10 wt. % of the binder.

When the amount of the lithium titanate is less than the above lower limit, the capacity of the cell tends to decrease and high capacity may not be achieved. When the amount of the lithium titanate exceeds the above upper limit, the amounts of the electrical conducting aid and binder decrease correspondingly, and the conductivity or strength of the positive electrode mixture may decrease.

When the amount of the conducting aid is less than the above lower limit, the electrical conductivity may decrease. When the amount of the conducting aid exceeds the above upper limit, the amount of the lithium titanate decreases correspondingly and the capacity of the cell may decrease.

When the amount of the binder is less than the above lower limit, the integrity of the positive electrode mixture may decrease and shaping of the mixture may become difficult. When the amount of the binder exceeds the above upper limit, the amount of the lithium titanate decreases correspondingly and the capacity of the cell may decrease.

The production method for the positive electrode is not limited to the above method, and compositions of the components are not limited to the above described one.

A negative electrode is preferably prepared by mixing a carbonaceous material as a negative electrode active material and a binder to obtain a negative electrode mixture, and shaping the mixture under pressure.

Examples of the carbonaceous material as the negative electrode active material are synthetic graphite, natural graphite, low crystalline carbon, coke, anthracite (hard coal), and the like. In particular, synthetic graphite is preferable, since it can achieve the higher capacity than other carbonaceous materials.

Fluororesins are preferably used as binders. Examples of fluororesins are polytetrafluoroethylene, polyvinylidene fluoride, and the like.

The proportions of the components constituting the negative electrode are preferably 80 to 95 wt. % of the carbonaceous material as the negative electrode active material and 5 to 20 wt. % of the binder.

When the amount of the carbonaceous material as the negative electrode active material is less than the above lower limit, it may be difficult to obtain a lithium secondary cell having a high capacity. When the amount of the carbonaceous material exceeds the above upper limit, the amount of the binder decreases, and thus the integrity of the positive electrode mixture may decrease and shaping of the mixture may become difficult.

The production method for the negative electrode is not limited to the above method, and compositions of the components are not limited to the above described one. For example, a conducting aid may be added to the negative electrode mixture.

In the present invention, the cell comprises an electrolytic solution which is prepared by dissolving a lithium salt in an organic solvent. Examples of the organic solvent used as the solvent for the electrolytic solution are propylene carbonate, ethylene carbonate, butylene carbonate, γ-butyrolactone, 1,2-dimethoxyethane, dimethoxymethane, tetrahydrofuran, dioxolane, and the like.

Examples of the lithium salt are $LiN(CF_3SO_2)_2$, $LiClO_4$, $LiPF_6$, $LiBF_4$, $LiSF_6$, $LiSbF_6$, $LiCF_3SO_3$, $LiCF_3CO_2$, $LiC_nF_{2n+1}SO_3$ ($n \leq 2$), $LiN(CF_3CF_2SO_2)_2$, and the like. Among them, $LiN(CF_3SO_2)_2$, $LiPF_6$, $LiCF_3SO_3$ and $LiBF_4$ are preferably used since they have high conductivity, and are thermally stable.

The concentration of the lithium salt in the electrolytic solution is not limited, and is usually between 0.1 and 2 mole/l, preferably between 0.4 and 1.4 mole/l.

The structure and production method of the lithium secondary cell of the present invention are substantially the same as those of conventional lithium secondary cells except that the above positive and negative electrodes and electrolytic solution are used.

EXAMPLES

The present invention will be illustrated by the following Examples, which do not limit the scope of the present invention in any way.

Example 1

Anatase titanium oxide (2 moles) and lithium hydroxide (1 mole) were mixed and calcined using an electric furnace in air at 800° C. for 8 hours, and a lithium titanate was obtained. The composition of this lithium titanate was analyzed by atomic absorption analysis, and found to be $Li_{1.33}Ti_{1.67}O_4$.

The obtained lithium titanate (100 wt. parts), carbon black (5 wt. parts) and graphite (5 wt. parts) as conducting aids, and polytetrafluoroethylene (5 wt. parts) as a binder were mixed in isopropanol to prepare a positive electrode mixture. After evaporating off the solvent, the positive electrode mixture was molded in the form of a pellet having a diameter of 6.0 mm and a thickness of 0.5 mm. The pellet was dried and dehydrated with a far-infrared drier at 250° C. for 30 minutes to form a positive electrode.

Separately, synthetic graphite (90 wt. parts) and polyvinylidene fluoride (10 wt. parts) as a binder were mixed in N-methylpyrrolidone to prepare a negative electrode mixture. After evaporating off the solvent, the negative electrode mixture was molded in the form of a pellet having a diameter of 3.5 mm and a thickness of 1.0 mm. The pellet was dried and dehydrated with a far-infrared drier at 120° C. for 30 minutes to form a negative electrode.

An electrolytic solution, which was prepared by dissolving $LiN(CF_3SO_2)_2$ in a mixed solvent of ethylene carbonate and diethyl carbonate in a volume ratio of 1:1 at a concentration of 1.0 mole/l, was used.

Using the above positive and negative electrodes and electrolytic solution, a lithium secondary cell having the structure shown in FIG. 1 and an outer diameter of 6.7 mm and a height of 2.1 mm was assembled.

In FIG. 1, a positive electrode 1 consisted of a press molded article of a positive electrode mixture containing the lithium titanate ($Li_{1.33}Ti_{1.67}O_4$) as an active material, carbon black and graphite as conducting aids, and polytetrafluoroethylene as a binder.

A negative electrode 2 consisted of a press molded article of a negative electrode mixture containing synthetic graphite as an active material and polyvinylidene fluoride as a binder. A separator 3 made of polypropylene non-woven fabric was inserted between the positive electrode 1 and negative electrode 2.

During assembling of the cell, the negative electrode 2 was doped with lithium ions in the presence of an electrolytic solution while placing metal lithium in an amount corresponding to 80% of the electric capacity of the positive electrode on the opposite side of the separator 3.

The positive electrode 1, negative electrode 2, separator 3 and electrolytic solution were sealed in a space formed by a positive electrode can 4 made of stainless steel, a negative electrode can 5 made of stainless steel, and an insulation packing 6 made of polypropylene.

Example 2

A lithium secondary cell was produced in the same manner as in Example 1 except that an electrolytic solution, which had been prepared by dissolving $LiPF_6$ in place of $LiN(CF_3SO_2)_2$ in a mixed solvent of ethylene carbonate and diethyl carbonate in a volume ratio of 1:1 at a concentration of 1.0 mole/l, was used.

Comparative Example 1

A lithium secondary cell was produced in the same manner as in Example 1 except that lithium iron oxide ($LiFe_5O_8$) was used as a positive electrode active material in place of a lithium titanate.

Figure 2:
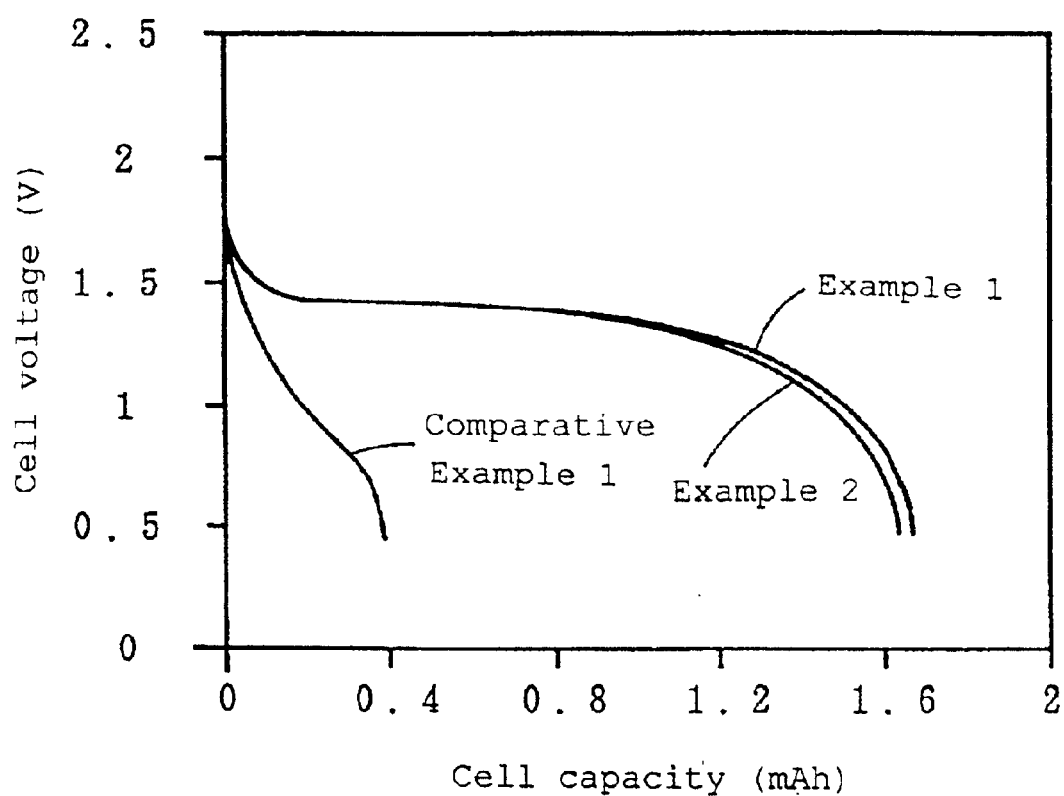
FIG. 2 is a graph showing the discharge properties of the cells of Examples 1 and 2 and comparative Example 1 in the first discharge.
Figure 3:
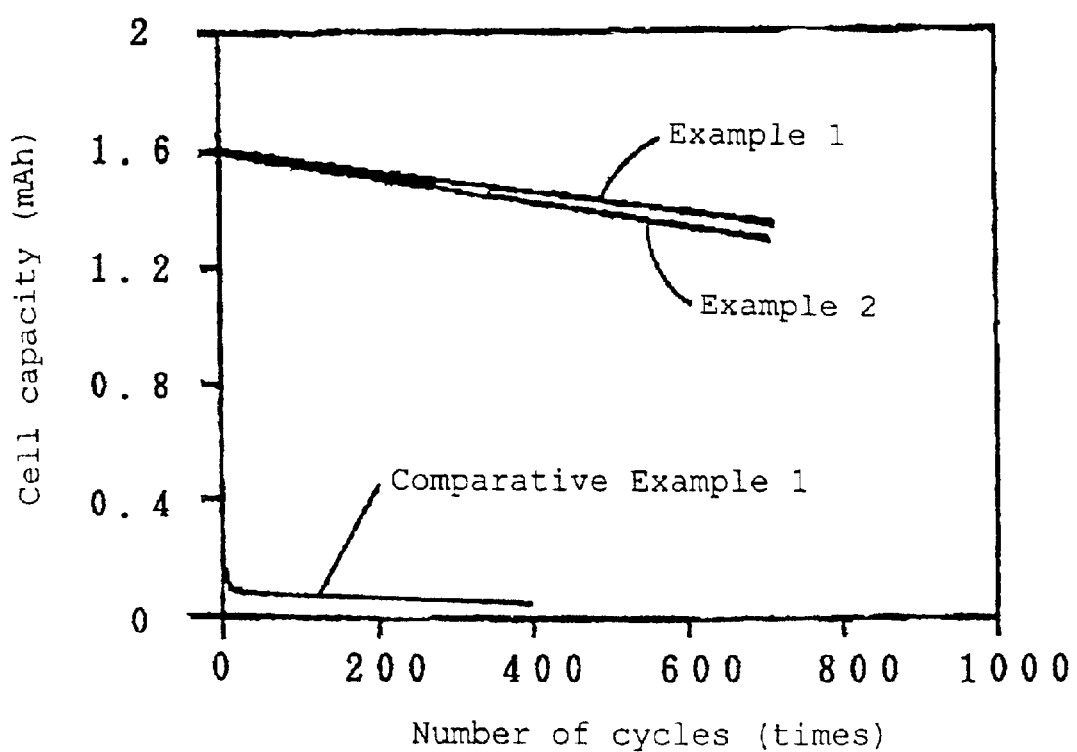
FIG. 3 is a graph showing the charge-discharge cycle properties of the cells of Examples 1 and 2 and comparative Example 1.

Each of the cells produced in Examples 1 and 2 and Comparative Example 1 was charged and discharged under the following conditions, and the discharge property in the first discharge, and the charge-discharge cycle property were evaluated:

Charging conditions: constant current, 0.1 mA and
  charge cut voltage, 2.4 mA
Discharging conditions: constant current, 0.1 mA and
  discharge cut voltage, 0.4 mA The discharge properties in the first discharge are shown in FIG. 2, and the charge-discharge properties are shown in FIG. 3.

As seen from FIG. 2, the cells of Examples 1 and 2 had better flatness of the cell voltage around 1.5 V and larger cell capacity down to 0.4 V than the cell of Comparative Example 1. Thus, the cells of Examples 1 and 2 had a high capacity.

As seen from FIG. 3, the cells of Examples 1 and 2 had the larger cell capacity than the cell of Comparative Example 1 after the same number of cycles. Furthermore, the former cells suffered less decrease of cell capacity due to the increase of the number of cycles than the latter cell. That is, the cells of Examples 1 and 2 had good charge-discharge cycle properties.

In contrast, the cell of Comparative Example 1 had a small cell capacity, and the cell capacity dropped sharply in the early cycles of charge and discharge. That is, this cell had low charge-discharge cycle properties. These properties of the cell of Comparative Example 1 may be attributed to the destabilization of the crystal structure of lithium iron oxide, which was used as the positive electrode active material, during the charge and charge cycles.

A lithium secondary cell was produced in the same manner as in Example 1 or 2 using the same electrolytic solution and negative electrode, and the lithium titanate having the composition of $Li_1Ti_2O_4$ or $Li_{0.8}Ti_{2.2}O_4$ in place of $Li_{1.33}Ti_{1.67}O_4$, and a cell capacity and charge-discharge cycle properties were evaluated. The results were the same as those in Examples 1 and 2.

As explained above, the present invention can provide lithium secondary cells having a high capacity and good charge-discharge cycle properties at a nominal voltage of 1.5 V, since a lithium titanate of the formula: $Li_xTi_yO_4$ is used as a positive electrode active material, and a carbonaceous material such as synthetic graphite is used as a negative electrode active material.

What is claimed is:

1. A method of manufacturing a lithium secondary cell which comprises:

assembling a positive electrode, a negative electrode, and a separator between the positive electrode and the negative electrode, in an electrolytic solution, the positive electrode containing lithium titanate as an active material, the negative electrode containing carbonaceous material as an active material, and the electrolytic solution comprising a lithium salt in an organic solvent;

doping lithium ions into the negative electrode, wherein the doping is performed by placing metallic lithium in the cell in an amount corresponding to about 80% of an electric capacity of the positive electrode; and sealing the positive electrode, the negative electrode, the separator and the electrolytic solution in a space formed by a positive electrode can, a negative electrode can and an insulation packing.

2. The method of claim 1, wherein the lithium titanate has a composition represented by the formula:

wherein x and y are between about 0.8 and about 1.4 (0.8 $\leq$ x $\leq$ 1.4) and about 1.6 and about 2.2 (1.6 $\leq$ y $\leq$ 2.2), respectively.

3. The method of claim 1, wherein the lithium ions are doped and dedoped at a nominal voltage of about 1.5 V.

4. The method of claim 1, wherein the lithium titanate was prepared by heating titanium oxide and a lithium compound at a temperature between about 760 and about 1100° C.

5. The method of claim 1, wherein the positive electrode is prepared by:

mixing the lithium titanate, a conducting aid and a binder; and shaping under pressure.

6. The method of claim 1, wherein the negative electrode is prepared by:

mixing the carbonaceous material and a binder to obtain an negative electrode mixture; and shaping the negative electrode mixture under pressure.

7. The method of claim 1, wherein the electrolytic solution is prepared by:

dissolving a lithium salt in an organic solvent.

8. The method of claim 7, wherein the organic solvent is at least one selected from the group consisting of propylene carbonate, ethylene carbonate, butylene carbonate, γ-butyrolactone, 1,2-dimethoxyethane, dimethoxymethane, tetrahydrofuran and dioxolane.

9. The method of claim 7, wherein the lithium salt is at least one selected from the group consisting of $LiN(CF_3SO_2)_2$, $LiClO_4$, $LiPF_6$, $LiBF_4$, $LiAsF_6$, $LiSbF$, $LiCF_3SO_3$, $LiCF_3CO_2$, $LiC_nF_{2n+1}SO_3$, and $LiN(CF_3CF_2SO_2)_2$.

10. The method of claim 1, wherein a concentration of the lithium salt in the electrolytic solution is between about 0.1 and about 2 mole/l.

11. The method of claim 4, wherein the titanium oxide is anatase or rutile.

12. The method of claim 4, wherein the lithium compound is at least one selected from the group consisting of lithium hydroxide, lithium carbonate and lithium oxide.

13. The method of claim 1, wherein the carbonaceous material is at least one selected from the group consisting of synthetic graphite, natural graphite, low crystalline carbon, coke and anthracite.

14. The method of claim 5, wherein the binder is a fluororesin.

15. The method of claim 6, wherein the binder is a fluororesin.

16. The method of claim 5, wherein the positive electrode contains about 70–90 wt % of the lithium titanate, about 5–20 wt % of the conducting aid, and about 1–10% of the binder.

17. The method of claim 5, wherein the conducting aid is at least one selected from the group consisting of scaly graphite, acetylene black and carbon black.

18. The method of claim 6, wherein the negative electrode contains about 80–95% of the carbonaceous material and about 5–20% of the binder.

* * * * *